United States Patent
Sakamoto et al.

(10) Patent No.: US 6,850,485 B2
(45) Date of Patent: Feb. 1, 2005

(54) PACKET HANDLER

(75) Inventors: Ken'ichi Sakamoto, Tokyo (JP);
Yasunari Shinohara, Kawasaki (JP);
Takahiko Kozaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 671 days.

(21) Appl. No.: 09/955,159

(22) Filed: Sep. 19, 2001

(65) Prior Publication Data

US 2002/0012317 A1 Jan. 31, 2002

Related U.S. Application Data

(63) Continuation of application No. 09/210,849, filed on Dec. 15, 1998, now Pat. No. 6,327,244, which is a continuation of application No. 08/826,523, filed on Apr. 3, 1997, now Pat. No. 5,903,544.

(30) Foreign Application Priority Data

Apr. 5, 1996 (JP) ............................................. 8-083550

(51) Int. Cl.[7] .............................................. G01R 31/08
(52) U.S. Cl. ........................................ 370/218; 370/217
(58) Field of Search ................................ 370/218, 217,
370/219, 220, 225, 227, 230, 235, 242,
244, 248, 250, 395.1, 396, 402, 419, 420

(56) References Cited

U.S. PATENT DOCUMENTS

| | | | |
|---|---|---|---|
| 5,069,521 A | 12/1991 | Hardwick | |
| 5,177,736 A | 1/1993 | Tanabe et al. | |
| 5,274,633 A | 12/1993 | Kato et al. | 370/219 |
| 5,285,441 A | 2/1994 | Bansal et al. | 370/218 |
| 5,390,174 A | 2/1995 | Jugel | 370/392 |
| 5,436,886 A | 7/1995 | McGill | 370/219 |
| 5,537,400 A | 7/1996 | Diaz et al. | |
| 5,568,300 A | 10/1996 | Ishibashi | 359/137 |
| 5,627,822 A | 5/1997 | Edmaier et al. | 370/218 |
| 5,712,847 A | 1/1998 | Hata | 370/228 |
| 5,737,338 A | 4/1998 | Eguchi et al. | 714/716 |
| 5,946,294 A | 8/1999 | Stein | 370/221 |
| 5,983,260 A | 11/1999 | Hauser et al. | 709/201 |
| 6,055,224 A * | 4/2000 | King | 370/217 |
| 6,201,789 B1 * | 3/2001 | Witkowski et al. | 370/230 |

FOREIGN PATENT DOCUMENTS

JP          A-4276943          4/1992

* cited by examiner

Primary Examiner—Phirin Sam
(74) Attorney, Agent, or Firm—Antonelli, Terry, Stout and Kraus, LLP

(57) ABSTRACT

A packet handler includes an interface circuit of an ATM handler corresponding in one-to-one relation to each input/output port of an ATM switch. A switch interface including a disconnection circuit and a distribution circuit controls the cell flow from each interface circuit to a corresponding input port and the cell from the output ports of the ATM switch to each interface circuit. In a pet of interface circuits, one redundant transmission path can be replaced arbitrarily with two nonredundant independent transmission paths. The ATM communication system can thus accommodate redundant transmission paths and nonredundant transmission paths in an arbitrary ratio.

2 Claims, 8 Drawing Sheets

| SETTING VALUE OF REGISTER 30 | 0 | | 1 |
|---|---|---|---|
| SETTING VALUE OF REGISTER 31 | 0 | 1 | - |
| STATUS OF AND GATE 32-0 | OPEN | CLOSE | OPEN |
| STATUS OF AND GATE 32-1 | CLOSE | OPEN | OPEN |

LIF: LINE CARD
CLK: CLOCK CARD
SW: ATM SWITCH CARD
CP: CONTROL CARD

LIF: LINE CARD
CLK: CLOCK CARD
SW: ATM SWITCH CARD
CP: CONTROL CARD

PACKET HANDLER

This is a continuation of application Ser. No. 09/210,849, filed Dec. 15, 1998 now U.S. Pat. No. 6,327,244; which is a continuation of Ser. No. 08/826,523, filed Apr. 3, 1997, now U.S. Pat. No. 5,903,544.

BACKGROUND OF THE INVENTION

The present invention relates to a packet handler. More Particularly, the present invention relates to a packet handler of asynchronous transfer mode (ATM) for fixed-length packets.

An ATM handler for transferring various information is fixed-length packets (hereinafter referred to as "cell", as shown by reference numeral 1 in FIG. 2, for example, comprises a plurality of line interfaces (hereinafter referred to as the interface circuit) 3 for accommodating a plurality of transmission paths 2 (2-1 to 2-n') each including a pair of input and output lines, an ATM switch common part 4 including an ATM switch (ATM SW) 5 for distributing the input cells passed through each interface circuit 3 among the interface circuits in accordance with the routing information contained in the cell header, and a control part 9 connected to the interface circuits 3 of the ATM common switch part 4 through a control line 10.

Each interface circuit 3 includes the physical layer processing function for processing signals transmitted to and received from the transmission paths 2 in the physical layer, such as the photo-electric conversion in which the input light signal from an incoming line is converted into an electric signal and the electro-optic conversion of an output signal to an outgoing line, and the ATM layer processing function for processing signals for input and output cells in ATM layer, rewriting the header information (VPI/VCI) of the input cell into the header information for the output cell with reference to a header conversion table while at the same time such converting the header for adding the routing information required for the switching operation as the internal header information.

The control part 9 performs such operations as controlling the connections, rewriting the header conversion table information of each interface circuit 3 accompanying the setting/resetting the connection and collecting the various performance information acquired in each interface circuit 3 as well as the monitoring of the state of the ATM handler as a whole including the operation of the ATM switch common part 4. The control part 9 is linked with a network management function 13 via a communication line 12 to transmit various information to the network management function 13 in response to an order from the network management function 13 which is a higher level device of the control part 9.

In an ATM network requiring a high reliability like a public network, main transmission paths are made redundant in preparation for maintenance, inspection and detouring at the time of occurrence of a defect.

In employing a redundant transmission path, an interface circuit 3-i for accommodating one redundant transmission path 2-i (i=1 to n) is paired with an interface circuit 3-i' for accommodating the other transmission path 2-i'. One of the interface circuits is used as an active path, and the other as a standby path. The input cells from the interface circuits for active path are selected by a selector and input to an ATM switch 5. In such a case, as shown in FIG. 2, for example, a switching interface 6 including a selector 11 is provided for each pair of the interface circuits 3. In this way, only the input cells arriving from the interface circuits for an active path are led to input ports I (I-1 to I-n) of the ATM switch 5. The cells output from the output ports O (O-1 to O-n) of the ATM switch 5 are distributed between the two interface circuits of the pair at the switching interface 6.

Various forms of redundant architecture are available for transmission paths of a network.

FIG. 3 shows a network configuration in which a plurality of ATM handlers 1 are connected in mesh by a backbone network 2-b and each transmission path (backbone network) 2-b between the ATM handlers except for the subscriber lines 2-a are made redundant. On the other hand, FIG. 4 shows a network configuration in which a plurality of ATM handlers 1-a accommodating subscriber lines 2-a are bundled by ATM handlers 1-b as a backbone network. In this way, the number of backbone transmission paths for the ATM handlers 1-a at each terminal is reduced while the trunk line transmission paths 2-b are made redundant.

As seen from the above-mentioned two network configurations, the ATM handlers 1 desirably accommodate both the redundant transmission paths 2-b and the nonredundant transmission paths 2-a in any proportion ranging from the one in which all the lines accommodated are redundant to the one in which all the lines accommodated are nonredundant, as required.

In the system configuration shown in FIG. 2 comprising the selector 11 for each port I-i of the ATM switch 4 and a pair of the interface circuits 3 accommodating the redundant transmission path selectively connected through the selector 11 to the input port I-i, however, only one of the two interface circuits 3 can be effectively utilized in accommodating an independently-used nonredundant transmission path, with the result that the slots formed in the housing of the ATM handlers for accommodating the other one of the interface circuits 3 are wasted.

Also, in the ATM handlers shown in FIG. 2 which has a pair of interface circuits 3 for each input port of the ATM switch, the cell amount applicable to the ATM switch 5 remains constant regardless of whether the transmission paths accommodated are redundant or used independently. For the proportion of space that the interface circuit board occupies in the housing of the ATM handlers, therefore, the switching capability of the ATM 5 switch 5 is low, thereby leading to the problem of the bulkiness of the system for the switching capacity.

SUMMARY OF THE INVENTION

An object of the present invention is to provide an ATM handler which can be reduced in size to meet the various network configuration requirements in versatile fashion.

Another object of the invention is to provide an ATM handler which can be reduced in size and which can accommodate redundant transmission paths and nonredundant transmission paths in an arbitrary proportion.

Still another object of the invention is to provide an ATM handler, or especially, an ATM exchange, which can accommodate both redundant and nonredundant transmission paths and which can exhibit a higher switching capacity with an increase in the proportion of nonredundant transmission paths.

In order to achieve the above-mentioned objects, according to one aspect of the present invention, there is provided an ATM handler comprising a plurality of input/output ports, a packet switch circuit for distributing the input packets from the input ports among the output ports as determined by the header information, a plurality of line interfaces corresponding to the input/output ports for accommodating a transmission path including an input line and an output line, and an input transfer control circuit for controlling the transfer of input packets in such a manner that the line interfaces are separated into a plurality of sets of a predetermined number. Each set of the line interfaces accommodate redundant transmission paths such that only the input packets from a line interface constituting an active path are applied to the corresponding input port of the packet switch while at the same time blocking the flow of packets from the other line interfaces constituting a standby path into the corresponding input ports of the packet switch. Each set of the line interfaces accommodate independent nonredundant transmission paths such that the input packets from each line interface are applied to the corresponding input ports of the packet switch.

According to another aspect of the invention, there is provided an ATM handler including, in addition to the above-mentioned input packet transfer control circuit, an output packet transfer control circuit for controlling the transfer of output packets in such a manner that for each set of the line interfaces accommodating independent nonredundant transmission paths the output packets are supplied to each line interface from the corresponding output ports of the packet switch. Each set of the line interfaces accommodating redundant transmission paths is such that the output packets applied to one of the output ports of the packet switch are supplied to all the line interfaces of the particular set. The function of the output packet transfer control circuit, however, can be replaced by the multicast function of the packet switch. For example, the packet switch may output different packets to the output ports corresponding to the line interfaces accommodating independent transmission paths, whereas the same packet may be multicast to the output ports corresponding to the line interfaces accommodating the redundant transmission paths.

According to a preferred embodiment of the invention, there is provided a packet handler including a switch interface corresponding to each pair of line interfaces for allowing or blocking the flow of packets from each line interface into the corresponding input ports of the packet switch in accordance with the operation mode of the transmission paths accommodated in the line interface pair.

The switch interface may include, for example, two gates for allowing or blocking the flow of packets from each line interface into corresponding input ports of the packet switch, and a control signal generating circuit for generating a control signal to be applied to each of the two gate in accordance with the operation mode of the transmission paths. The control signal generating circuit generates a control signal for opening one of the two gates and closing the other in the case where the transmission paths are in redundant mode, and a control signal for opening each of the gates in the case where the transmission paths are in non-redundant mode.

According to an embodiment of the invention, each switch interface includes a first register for storing the control information indicating the operation mode of a corresponding pair of transmission paths, and a second register for storing the control information designating the transmission path constituting an active path or a standby path in the case where the transmission paths are operated in redundant mode. The control signal generating circuit generates a gate control signal in accordance with the status of the control information stored in the first and second registers.

A packet handler according to the present invention has a feature in that the circuits are mounted in the housing in such a manner that the switch interfaces and the packet switch are formed on a circuit board. A predetermined number of the line interfaces are formed on each of a plurality of interface circuit boards, and each switch interface is arranged in correspondence with a line interface in such a manner that each two of the interface circuit boards is combined as a set. The switch interfaces formed on one of the circuit boards respectively correspond to the switch interfaces formed on the other circuit board.

BRIEF DESCRIPTION OF THE DRAWINGS

The foregoing and other objects, advantages, manner of operation and novel features of the present invention will be understood from the following detailed description when read in connection with the accompanying drawings, in which.

DESCRIPTION OF THE PREFERRED EMBODIMENTS

Figure 1:
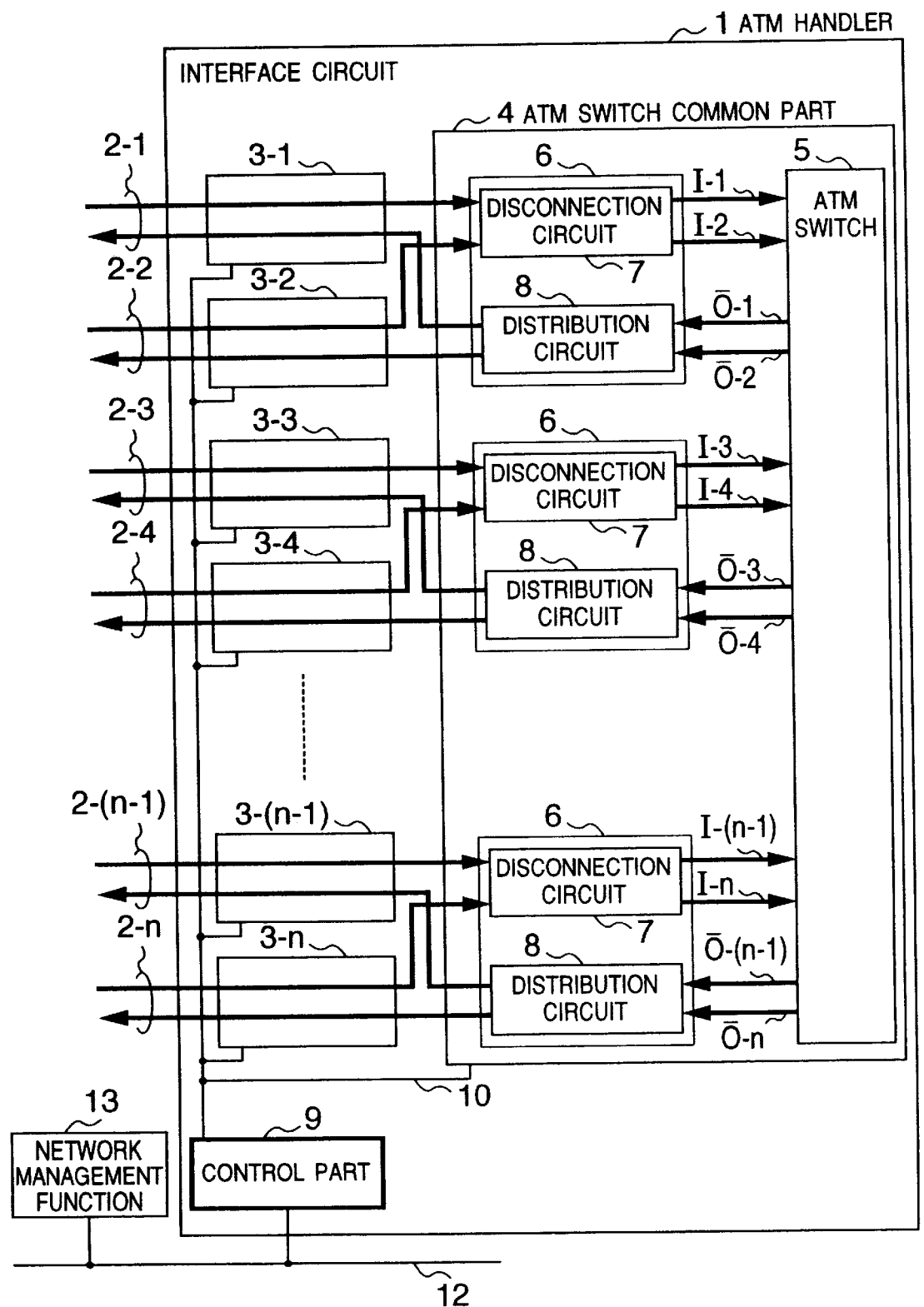
FIG. 1 is a diagram showing an ATM handler according to a first embodiment of the invention.
Figure 2:
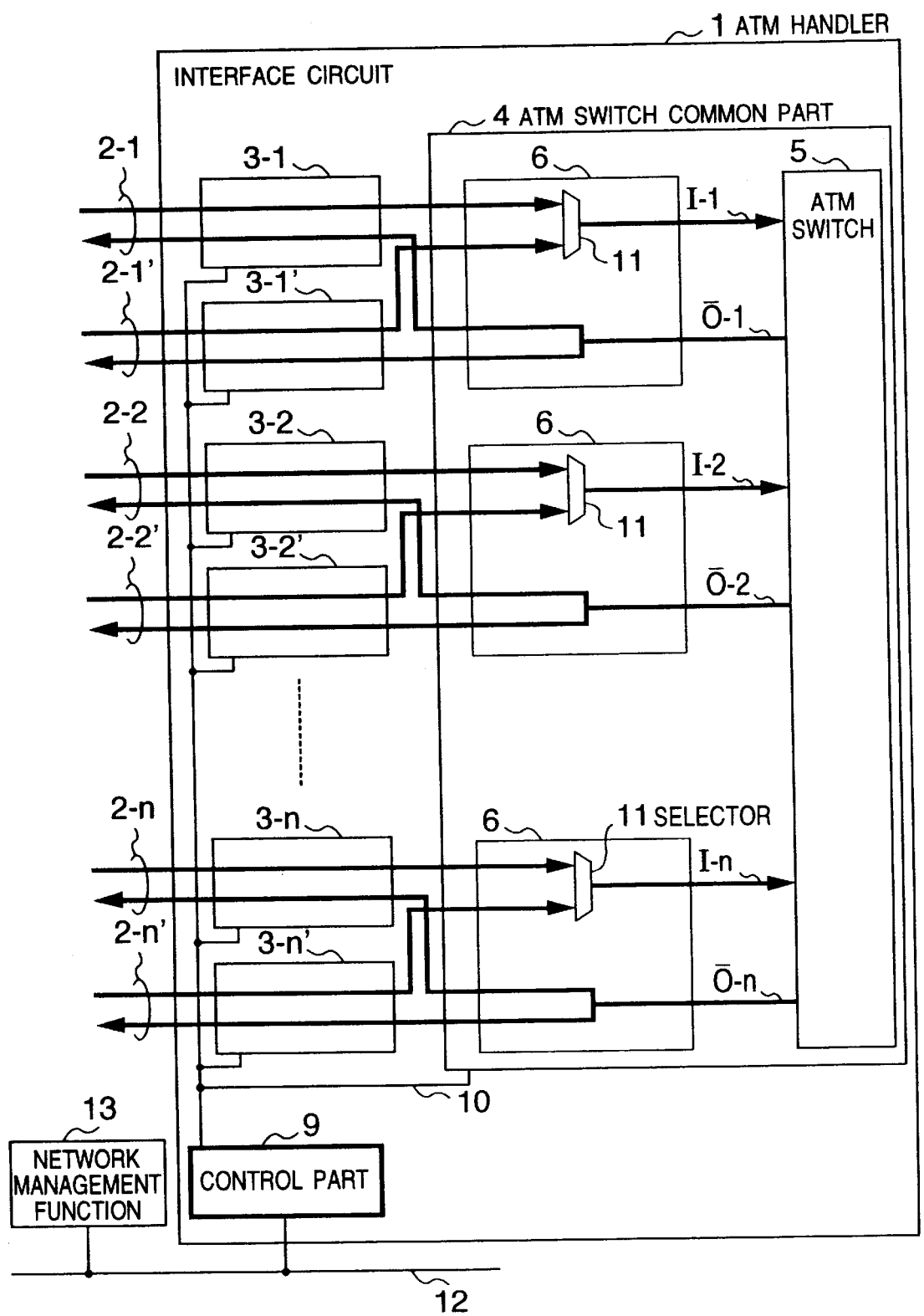
FIG. 2 is a diagram showing an example of an ATM handler capable of accommodating redundant transmission paths.
Figure 3:
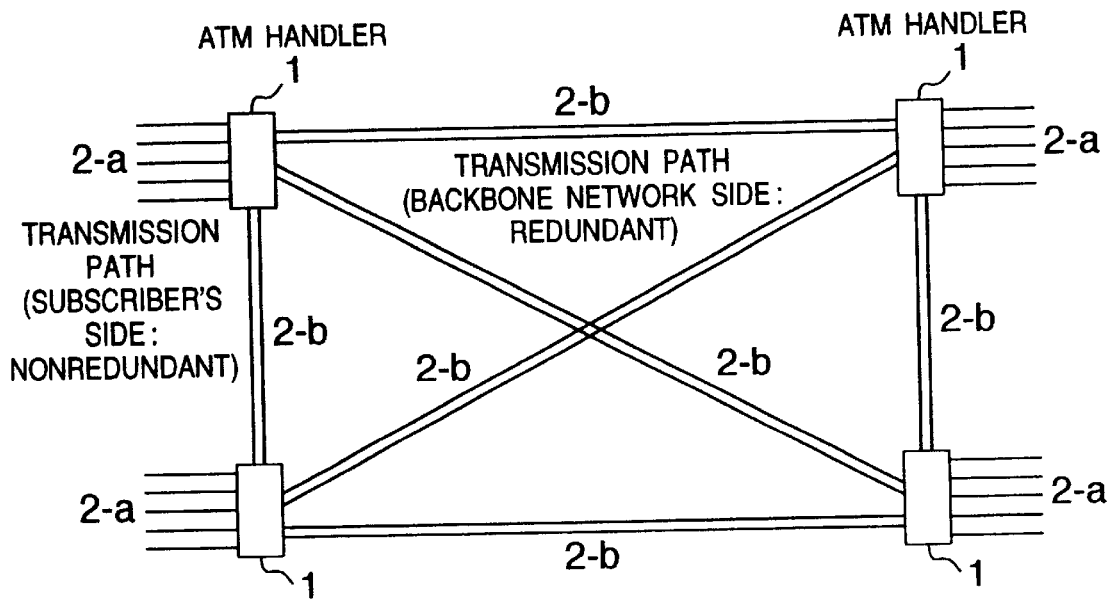
FIG. 3 is a diagram showing an example of a network configuration of redundant transmission paths.
Figure 4:
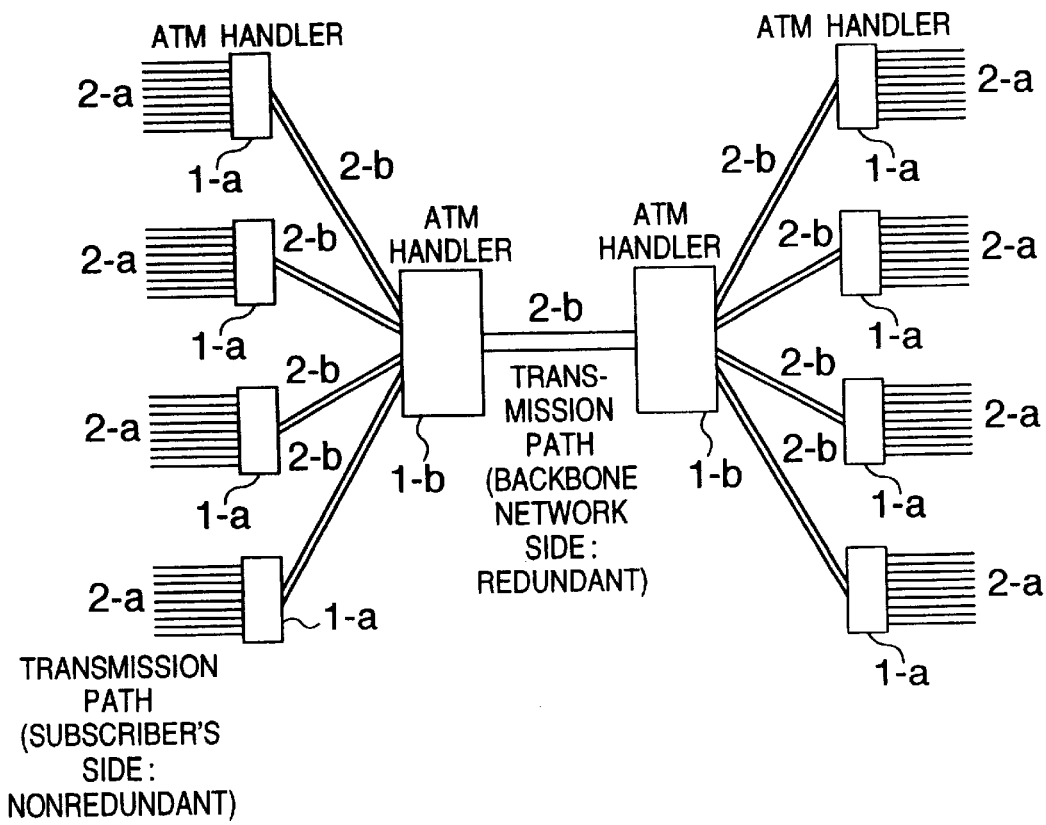
FIG. 4 is a diagram showing another example of a network configuration of redundant transmission paths.

FIG. 1 is a diagram showing a configuration of an ATM handler according to a first embodiment of the invention.

An ATM handler 1 includes a plurality of interface circuits 3 (3-1 to 3-$n$) for accommodating a plurality of transmission paths 2 (2-1 to 2-n), respectively, an ATM switch common part 4, and a control part 9 connected to the interface circuits 3 and the ATM switch common part 4 through a control transfer path 10. In FIG. 1, each interface circuit 3 is shown in a block. In an actual handler, however, as described later with reference to FIG. 5, the interface circuit 3 includes an input line interface 3a connected to an input line and an output line interface 3b connected to an output line, each having the physical layer processing function and the ATM layer processing function.

The ATM switch common part 4 includes an ATM switch 5 having a plurality of input ports I (I-1 to I-n) and a plurality of output ports O (O-1 to O-n), and a 15 plurality of switch interfaces 6 each having two input ports and two output ports as a set.

In the ATM handler according to this embodiment, the number of the interface circuits 3 corresponds to the number of input/output ports of the ATM switch. Each switch interface 6 includes a disconnection circuit 7 inserted between a set of input ports I-i, I-(i+1) and two input line interfaces 3a connected to two transmission paths 2-i, 2-(i+1), respectively, and a distribution circuit 8 arranged between a set of output ports 0-i, O-(i+1) and two output line interfaces 3b connected to the transraission paths 2-i, 2-(i+1), respectively.

Figure 5A:
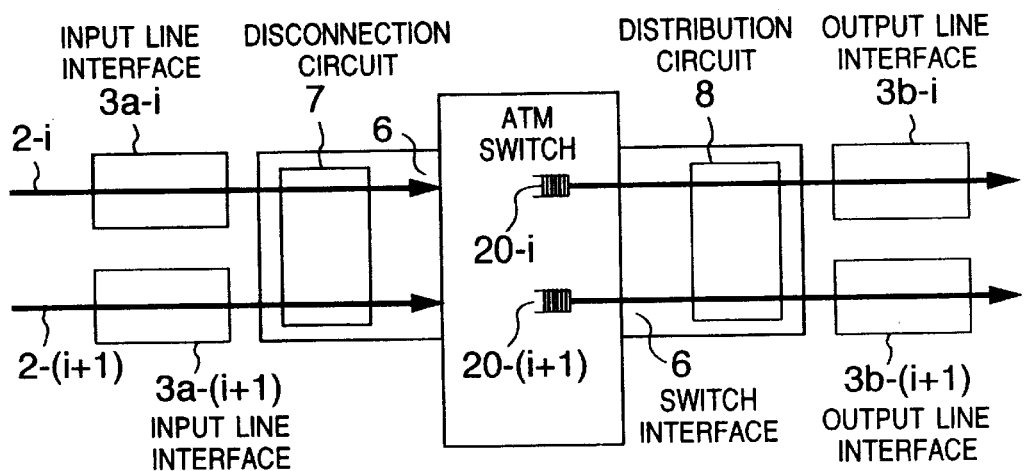
FIG. 5A is a diagram for explaining the functions of the switch interfaces 6 in the case where the ATM handler shown in FIG. 1 accommodates nonredundant transmission paths.
Figure 5B:
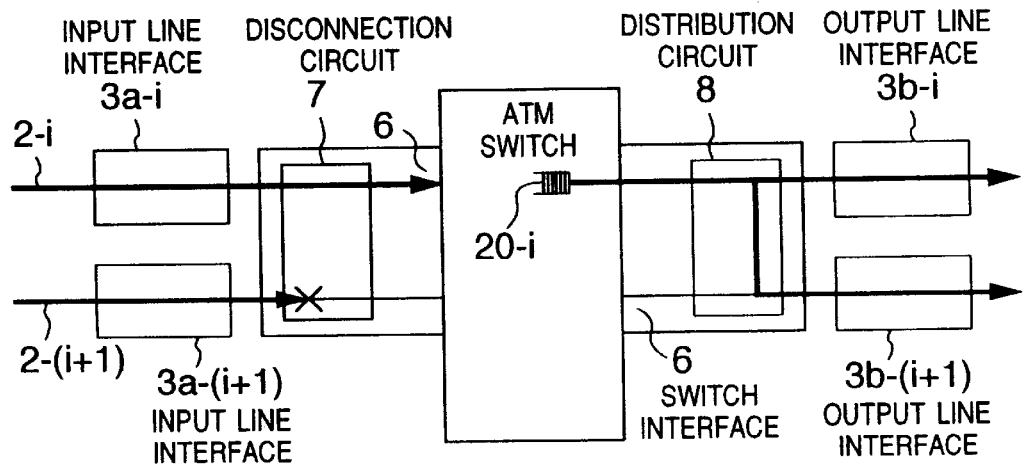
FIG. 5B is a diagram for explaining the functions of the switch interfaces 6 in the case where the transmission path 2-$i$ of the ATM handler shown in FIG. 1 is an active path.

The functions of the disconnection circuit 7 and the distribution circuit 8 will be explained with reference to FIGS. 5A and 5B. In FIGS. 5A and 5B, the solid lines show the signal flow, and the X marks indicate the signals being disconnected.

FIG. 5A shows the status of the switch interface 6 with two interface circuits a accommodating nonredundant paths. In this case, the disconnection circuit 7 supplies the input cells from the input line interfaces 3a-i, 3a-(i+1) without blocking to the two input ports I-i, I-(i+1) of the ATM switch 5.

The ATM switch 5, as proposed in JP-A-4-276943, for example, is of a common buffer type. In the ATM switch of common buffer type, the input cells supplied concurrently from a plurality of input ports are rearranged into temporal cell streams by a multiplexer and sequentially accumulated in a queue buffer corresponding to the output ports formed in the common buffer memory by a write control circuit. In order to read the cells from the common buffer memory, the queue buffer is accessed in the order of the output ports by a read control circuit, so that the leading cells of each queue buffer are read and sequentially distributed among the corresponding output ports by a demultiplexer. The write control circuit and the read control circuit alternately access the common buffer memory.

The write control circuit writes each input cell Paired with a pointer address, for example, in the common buffer memory, and stores the pointer address paired with an output port in an address table. The write address table is accessed on the basis of the routing information of each new input cell each time such a new input cell is supplied thereby to read the last pointer address for each output port specified by the routing information. With the last pointer address as a write address, the input cell and the new pointer address retrieved from a vacant address buffer are written in the common buffer memory. In this way, a logic queue buffer can be formed in which the input cells are linked sequentially by pointers for each output port.

The read control circuit stores a pointer address corresponding to each output port in the read address table, the pointer addresses are read from the table in the order of the output ports. with this pointer address as a read address, the cells are read out of the common buffer memory. In the process, the pointer addresses read with the cells are stored in the read address table. These pointer addresses are used as read addresses for the queue buffer at the next time point of outputting the cells to the corresponding output ports. The pointer addresses that have been used as a read address are registered as vacant addresses in the vacant address buffer.

In FIG. 5A, numerals 20-i and 20-(i+1) designate queue buffers formed in the common buffer memory of the ATM switch 5 and correspond to the output ports O-i and O-(i+1), respectively. The cells (output cells) retrieved from these queue buffers are supplied through the distribution circuit 8 to the output line interfaces 3b-i, 3b-(i+1), respectively, and after removing the internal cell information therefrom, are sent out to the transmission paths (output lines).

Figure 5C:
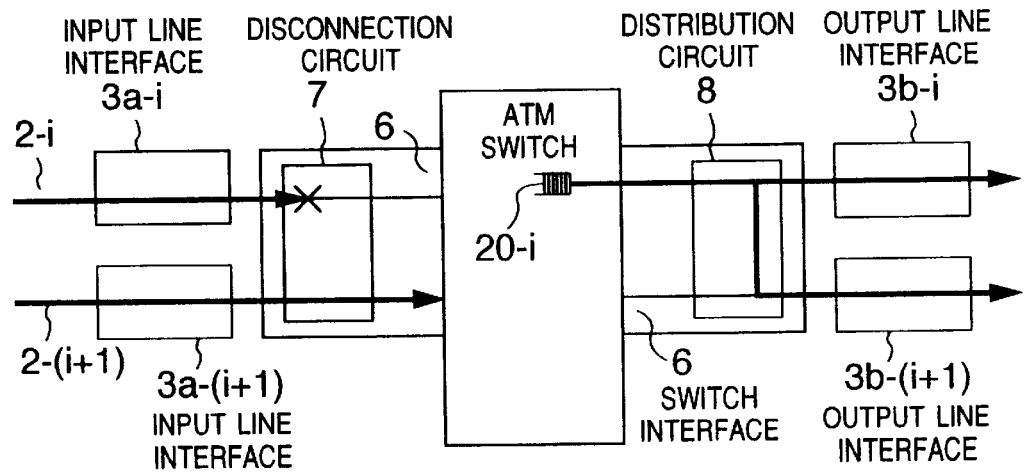
FIG. 5C is a diagram for explaining the functions of the switch interfaces 6 in the case where the transmission path 2-(i+1) of the ATM handler shown in FIG. 1 is an active path.

FIGS. 5B and 5C show the status of the switch interface 6 with redundant paths accommodated in the interface circuit.

FIG. 5B refers to the case in which the transmission path 2-i is an active path, and FIG. 5C the case in which the transmission path 2-(i+1) is an active 10 path.

According to this embodiment, as evident from FIG. 5C, for example, the output signal from one of a pair of input line interfaces 3a-i and 3a-(i+1), i.e., the input line interface 3a-i for active path, is applied through the 15 disconnection circuit 7 to the input port I-i of the ATM switch 5, while the output signal from the input line interface 3a-(i+1) for standby path is blocked by the disconnection circuit so that the input port I-(i+1) remains unused.

The ATM switch 5 forms a queue buffer 20-i corresponding to the output port 0-i connected to the output line 2-i constituting one of the redundant output lines. The output cells retrieved from the queue buffer 20-i are supplied to a pair of output line interfaces 3b-i, 3b-(i+1) through the distribution circuit 8, thereby sending, out the same signal (cell) to the redundant transmission paths 2-i, 2-(i+1).

Figures 6, 7:
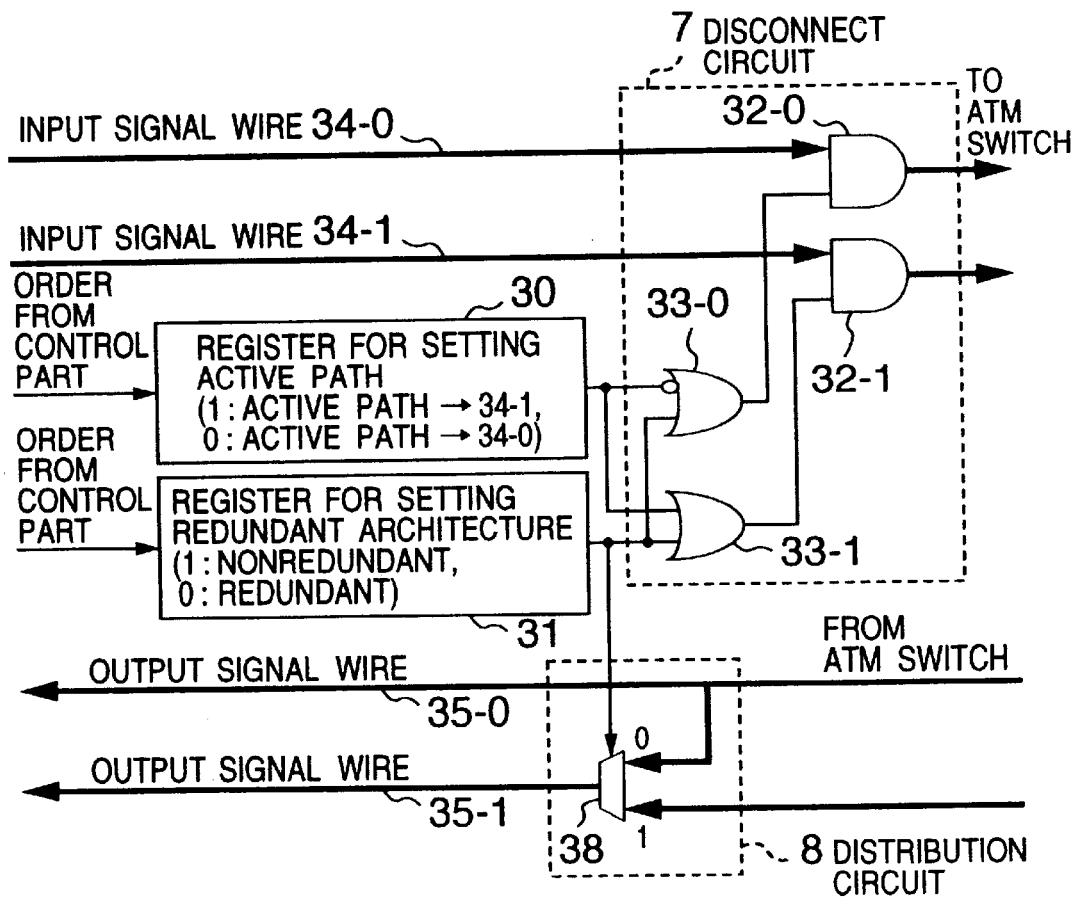
FIG. 6 is a circuit diagram showing the switch interface 6 according to an embodiment.
FIG. 7 is a diagram showing the correspondence between the setting of the registers 30, 31 of the switch interface 6 shown in FIG. 6 and the status of the AND gates 32-0, 32-1.

FIG. 6 shows the switch interface 6 including the disconnection circuit 7 and the distribution circuit 8 according to an embodiment. The input signal wire from the interface circuit 3-i is designated as 34-0, the input signal wire from the interface circuit 3-(i+1) as 34-1, the output signal to the interface circuit 3-i as 35-0, and the output signal line to the interface circuit 3-(i+1) as 35-1.

The disconnection circuit 7 includes AND gates 10-32-0 and 32-1 each supplied with one of the signals from the input signal wires 34-0, 34-1, and OR gates 33-0 and 33-1 for generating a control signal to be applied to the other input terminal of the AND gates. The output of the OR gates is determined by the value set in two registers including a register 31 for setting redundant architecture and a register 30 for setting an active path.

In the case where each of the interface circuits 3-i and 3-(i+1) constituting the interface circuit pair accommodates a redundant transmission path, the value mOm indicating a "redundant architecture" is set in the register 31, and a value indicating a particular input signal wire constituting an active path is set in the register 30. In the case where the interface circuits 3-i, 3-(i+1) accommodate two nonredundant independent transmission paths, on the other hand, the value "1" indicating a "redundant architecture" is set in the register 31.

The relation between the values set in the two registers (including the register 31 for setting the redundant architecture and the register 30 for setting an active path) and the status of each of the two AND gates 5 32-0, 32-1 is shown in FIG. 7.

The following control operation is possible by changing the values set in the registers in response to an instruction from the control part 9. Specifically, in the case where a transmission path of redundant architecture is accommodated, the AND gate for the input signal wire used as an active path is opened while the AND gate for the input signal wire used as a standby path is closed. In the case where a transmission path of nonredundant architecture is accommodated, on the other hand, both the AND gates are opened.

The distribution circuit 8 sends out the output cells of the output port 0-$i$ of the ATM switch to the output signal wire 35-0 of the two output signal wires, and the output signal selected by a selector 38 is sent out to the other output signal wire 35-1. The selector 38 is supplied with the output signals of the two output ports 0-$i$ and O-$(i+1)$ of the ATM switch and adapted to selectively output one of the two output signals in accordance with the setting of the redundant setting register 31.

In this example, assume the transmission paths are redundant. The setting of the redundant setting register 31 is "0", and therefore the same output (the output of the output port 0-$i$) is produced on the output signal line 35-1 as on the output signal line 35-0. In the case where the transmission paths are nonredundant, on the other hand, the setting of the register 31 is "1" and an output (the output of the output port O-$(i+1)$) different from that of the output signal line 35-0 is produced on the output signal line 35-1.

As evident from this embodiment, according to this invention, each interface circuit 3 is arranged in one-to-one correspondence with the input/output port of the ATM switch, and the switch interface circuit 6 (including the disconnection circuit 7 and the distribution circuit 8) is used to control the cells flow from each interface circuit into a corresponding input port and the cells flow from the output ports of the ATM switch into each interface circuit. Therefore, the interface circuits 3 of each pair correlated by the switch interface can accommodate two independent transmission paths in place of redundant paths, there-by eliminating the operative restriction of the interface circuits 3.

Figure 8:
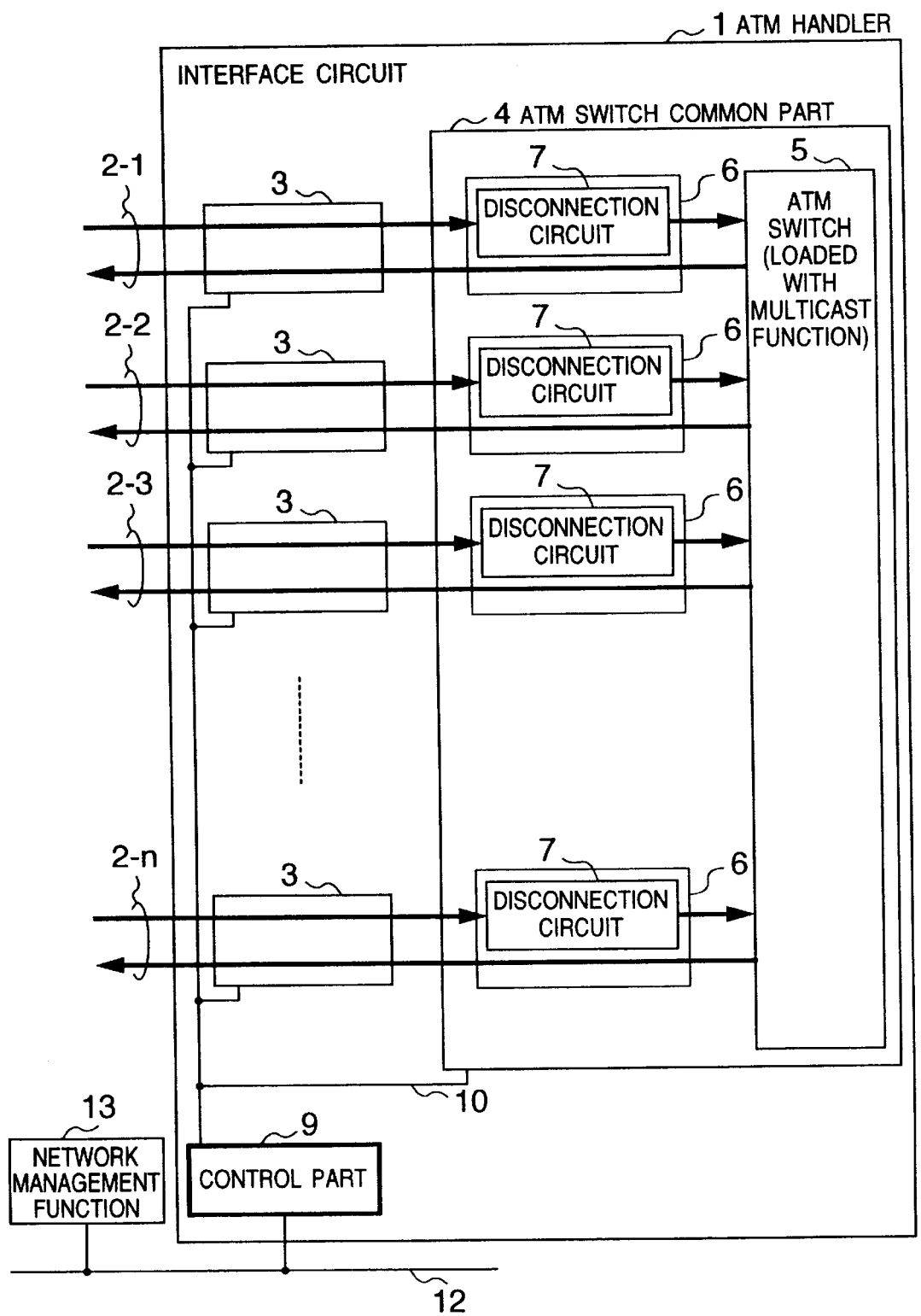
FIG. 8 is a diagram showing an ATM handler according to another embodiment of the invention.

FIG. 8 shows an ATM handler according to another embodiment of the invention.

In this embodiment, the ATM switch 5 has a multicast function so that the distribution circuit 8 is removed from the switch interfaces 6. The disconnection circuit 7 has the same functions as that of the embodiment shown in FIG. 1.

In the multicast operation, as described in JP-A4-276943, the same read address (pointer address) continues to be output from the read address table and the same cell (multicast cell) is repetitively read from the common buffer memory until the cells are output completely to all the destination output ports. Upon complete the last reading of the multicast cell, the read address is sent to a vacant address buffer, while at the same time the next pointer address read together with the multicast cell is stored in the read address table.

In order to realize the repetitive reading of the multicast cell, for example, the write operation of the next pointer address into the read address table and the release of the pointer address as a vacant address buffer are controlled by a band control table and a counter.

The output value (count value) of the counter corresponds to the output ports. Each time of count-up, therefore, the cell destination output port is switched. Also, the band control table has stored therein the output port information corresponding to the count values of the counter. Each time the count is updated, therefore, the output port information is generated. On the basis of the output port information, the read address table is accessed thereby to produce a queue buffer read address corresponding to the output ports.

In this case, the output port information stored in the band control table is adapted to be generated in different frequencies for different output ports, for example, with the result that the cells can be read more (or less) frequently to a specific output port than to other ports. The ATM handler can thus accommodate plural types of lines having different bit rates.

In writing the input cells into the common buffer memory by the write control circuit, for example, the queue buffer is formed in correspondence with a virtual path (VP), and a VP identifier is generated in place of the output port information from the band control table, and the read address for each VP is obtained from the read address table. In this way, the cell can be read for each VP from the common buffer memory.

In multicast operation, a flag bit storage area corresponding to the VP identifier for indicating whether the pointer address is to be updated or not are formed in the band control table. The VP identifiers of the multicast queue buffer are generated with a plurality of count values corresponding to the destination output ports of the multicast cell. The flag bit corresponding to the last VP identifier is used to generate a control signal for instructing to update the pointer address. The contents of the band control table are rewritten by the control part 9.

Figure 9A:
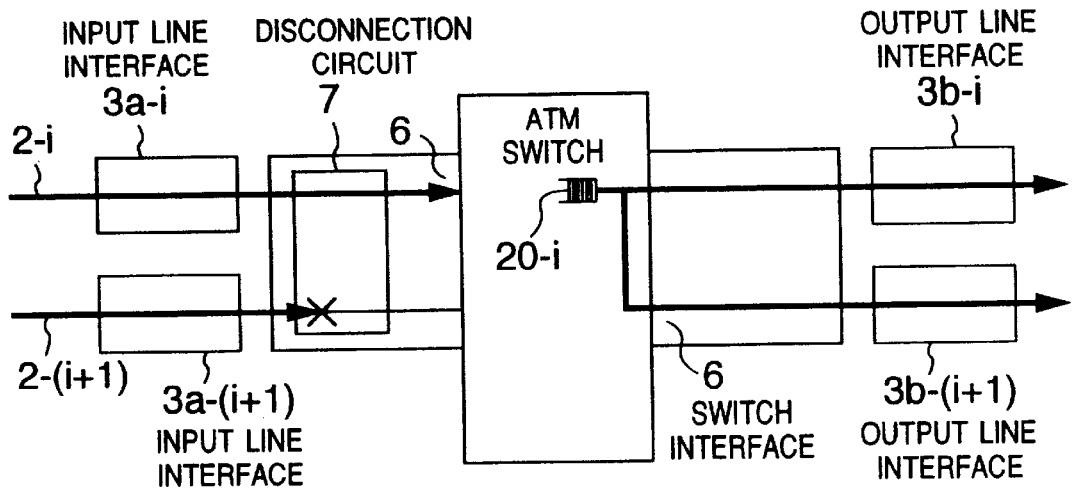
FIG. 9A is a diagram for explaining the functions of the switch interface 6 in the case where the transmission path 2-$i$ is an active path in the ATM handler shown in FIG. 8.
Figure 9B:
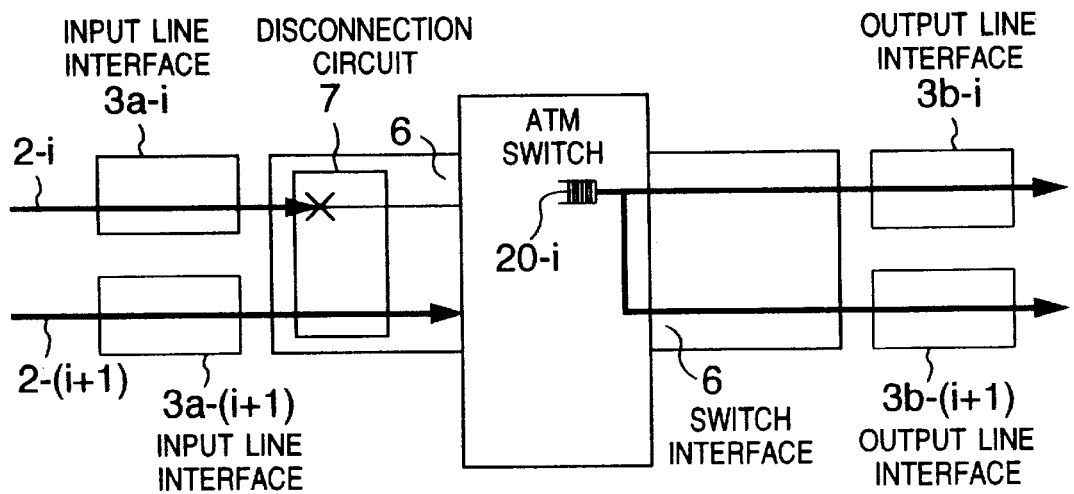
FIG. 9B is a diagram for explaining the functions of the switch interface 6 in the case where the transmission path 2-(i+1) is an active path in the ATM handler shown in FIG. 8.

FIGS. 9A and 9B show the functions of the switch interfaces 6 using the multicast function. FIG. 9A refers to the case in which the transmission path 2-$i$ is an active 25 path and the transmission path 2-$(i+1)$ is a standby path. FIG. 9B shows the reverse case.

The ATM switch 5 multicasts the cells stored in the queue buffer 20-$i$ to the two output ports O-$i$ and O $(i+1)$. The switch interface 6 on the output side, therefore, is not required to control the distribution of the output cells.

Figure 10:
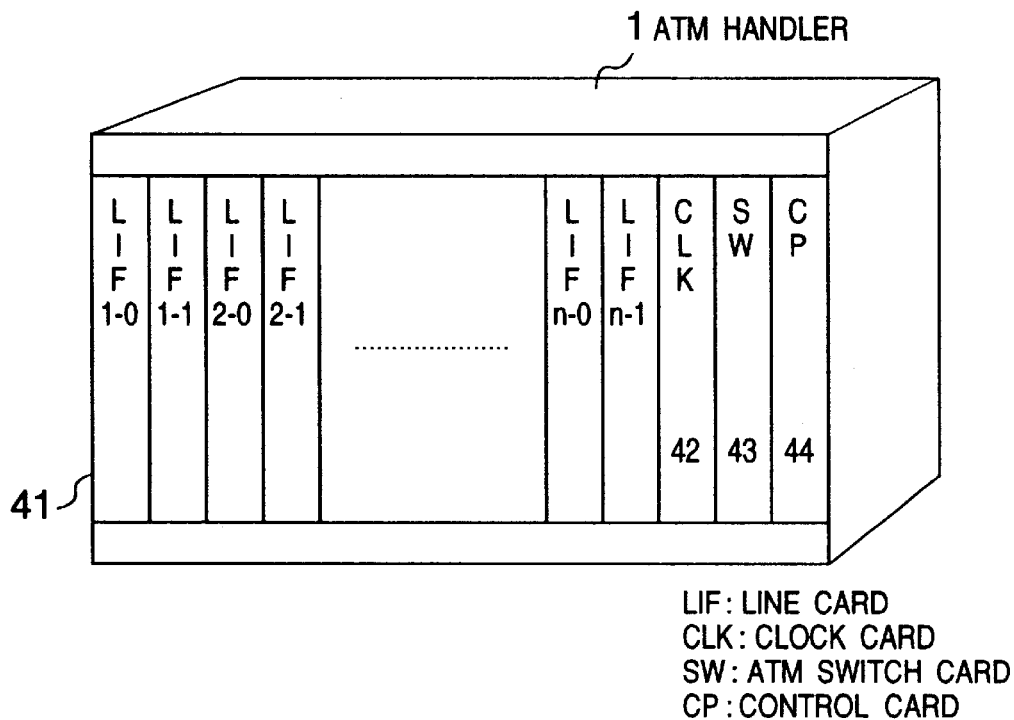
FIG. 10 is a diagram showing an example of the manner in which the essential circuit parts are accommodated in the ATM handler according to the present invention.

FIG. 10 shows an example of the manner in which the essential parts are accommodated in the housing of the ATM handler according to the invention.

In FIG. 10, numeral 41 designates a plurality of circuit boards (line cards) each having an interface circuit 3, numeral 42 a circuit board (clock card) having mounted thereon a system clock generator for generating various clock signals, numeral 43 a circuit board (ATM switch card) having mounted thereon the ATM common switch part 9, and numeral 44 a circuit board (control card) having mounted thereon a memory and a data processor making up the control part 9.

Each line card 41 includes at least one interface circuit 3. Each interface circuit pair constituting a redundant system including adjacent two line cards LIFI-O and LIFi-1 ($i=1$ to n) is connected to each switch interface 6 on the ATM switch card 43 through the backbone wiring not shown.

Figure 11:
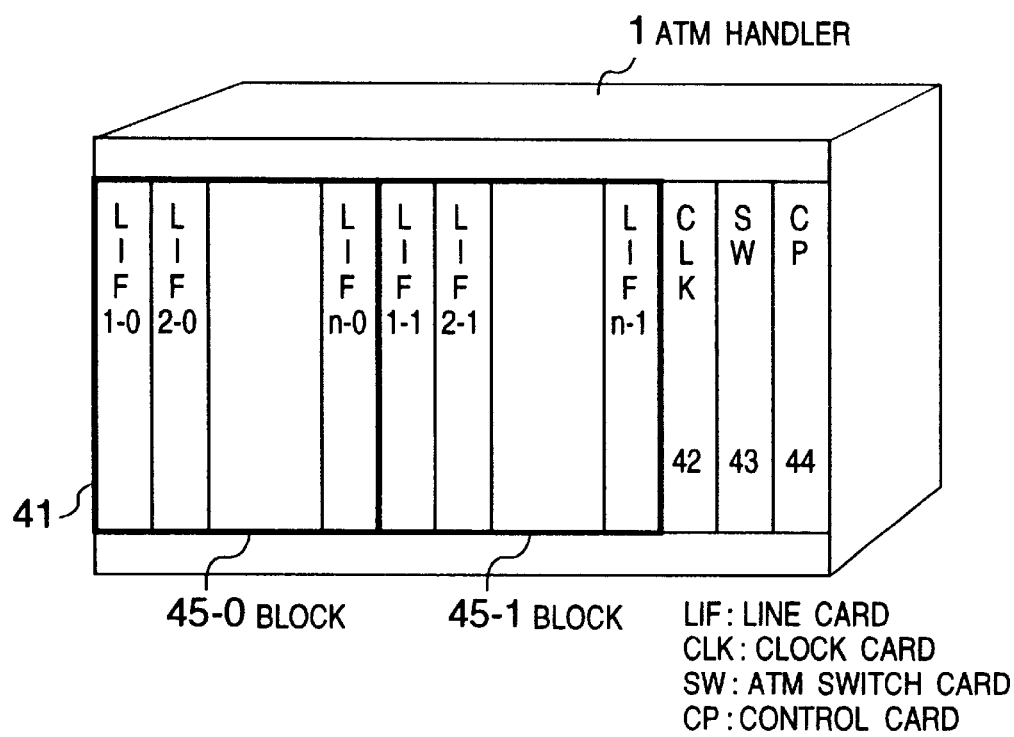
FIG. 11 is a diagram showing another example of the manner in which the essential circuit parts are accommodated in the ATM handler according to the present invention.

FIG. 11 shows another manner in which various circuit boards are arranged in the housing.

In this example, a plurality of line cards 41 are divided into two line card groups (blocks 45-0 and 45-1). The line cards LIFI-O ($i=1$ to n) of one line card group (block 45-0) is paired with each line card LIFi-l ($i=1$ to n) of the other line card group (block 45-1), so that the interface circuit of each pair constituting a redundant system is connected to each switch interface 6 on the ATM switch card 43.

In any of the above-mentioned arrangements, each line card 41 constituting a pair can freely accommodate nonredundant independent transmission paths. The configuration according to the invention can realize an ATM handler having an exchange capacity of 10 Gbps when all the line cards accommodate redundant transmission paths, for example, and also having an exchange capacity of 20 Gbps when all the line cards accommodate nonredundant independent transmission paths. The exchange capacity, however, is 15 Gbps, if one half of the transmission paths are used independently while the remaining one half of the transmission paths constitute redundant paths.

The operation mode (independent mode or redundant mode) of the transmission paths accommodated in each line card of the ATM handler according to the invention can be designated by the setting of the control register arranged in the switch interface on the ATM switch card. The setting of the control register can be determined by an instruction from the control part 9 or by way of an input unit connected to the ATM switch card. The present invention, therefore, can provide a versatile system for meeting—requirement of each network configuration.

It will thus be understood from the foregoing description that according to the invention, transmission paths of redundant architecture and transmission paths of independent applications can be accommodated in an arbitrary proportion, and therefore a compact handler configuration can meet various network configurations.

What is claimed is:

1. A packet handler comprising:

a plurality of slots each of which having installed therein a line interface;

a switch for switching packets; and a circuit for, upon receiving of packets by said line interface, determining whether to transfer the packets to said switch or to block the packets so as not to transfer the packets to said switch, wherein if the received packets include a pair of packets that are redundant with respect to each other, said circuit transfers one packet of the pair of redundant packets to said switch and blocks the other packet of the pair of redundant packets, and wherein said switch multi-casts the transferred one packet of the pair of redundant packets to line interfaces corresponding to line interfaces through which each of the pair of redundant packets was received.

2. A packet handler according to claim 1, wherein the line interfaces includes a pair of line interfaces each connected to the packet handler by a respective transmission path, transmitting packets that are redundant with respect to packets transmitted by each other, and the circuit performs the determination based on the transmission path through which the packets are transmitted.

* * * * *